United States Patent [19]

Olah

[11] Patent Number: 4,646,466

[45] Date of Patent: Mar. 3, 1987

[54] COMPLETE DEVELOPMENT OF BASIDIOMYCETES AGARICALES MUSHROOMS

[76] Inventor: Georges Olah, 8 Jardin Mérici, Apt. 1602, Quebec, Quebec, Canada, G1S 4N9

[21] Appl. No.: 726,360

[22] Filed: Apr. 23, 1985

[51] Int. Cl.$^4$ .............................................. A01G 1/04
[52] U.S. Cl. ..................................................... 47/1.1
[58] Field of Search ............................ 47/1.1, DIG. 6

[56] References Cited

U.S. PATENT DOCUMENTS

| | | | |
|---|---|---|---|
| 2,677,917 | 5/1954 | Speakman | 47/1.1 |
| 3,828,470 | 8/1974 | Stoller | 47/1.4 |
| 3,996,038 | 12/1976 | Toth et al. | 47/1.1 |
| 4,370,351 | 1/1983 | Harper | 47/1.1 |
| 4,443,989 | 4/1984 | Hanacek et al. | 47/1.1 |

OTHER PUBLICATIONS

"The Biology and Cultivation of Edible Mushrooms" by S. T. Chang ©1978 Academic Press Inc.

Primary Examiner—James R. Feyrer
Assistant Examiner—Bradley M. Lewis
Attorney, Agent, or Firm—Oblon, Fisher, Spivak, McClelland & Maier

[57] ABSTRACT

The disclosure describes a process for the culture of Quebec Pleurotus Super Mushroom. For this purpose, a substrate comprising straw, wood chips from broadleaved trees, crushed shelled ears of corn, vermiculite, Japanese millet, mixed cereal grains, lime, micro-cel, is seeded with the Quebec Pleurotus inoculum. The mixture is maintained at a humidity of 75 to 85% and a pH of 6.2 to 6.8. The system is given a photoperiod of 2.5 hr at a light intensity of 125 lux. Incubation temperature is maintained at 22° C. and fruiting temperature at about 14° C. to 21° C. This enables to obtain within 8 to 12 days of complete development, mushrooms of the class Basidiomycetes, Agaricales of the Pleurotaceae family, from the mushroom 107-Aa G. MYCOLA Inc. This mushroom is an excellent food, loaded with aromatic principles and enables to be prepared in many ways. In addition, it can be used as a laboratory tool, for teaching biology and botany, or has decorative use in a small interior garden. It requires only water and care to maintain a high degree of humidity. Between each production (growth of mushrooms) it can be refrigerated.

7 Claims, No Drawings

COMPLETE DEVELOPMENT OF BASIDIOMYCETES AGARICALES MUSHROOMS

Present everywhere around us, fungi play a very important part in our everyday life. Ancient civilisations utilised them as food. Those were, of course, naturally occurring field mushrooms.

From time immemorial, however, mushrooms as a food have been considered exceptional with a unique and delicate taste and a real treat to the palate. Fungi are also used as condiment, like spices. The exquisite taste comes from native aromatic substances which, as soon as the mushrooms are ingested, trigger the secretion of digestive enzymes (glutamic acid) and, thus, helps in the digestion of other food substances.

Our cave-dwelling ancestors, the Greeks and the Romans and others seem to have really appreciated mushrooms which were sought after by the gourmets of the era. To-day still, more than ever and thanks to the variety of flavours, different types of mushrooms lend themselves particularly well to the preparation of succulent dishes.

Because they sprout so suddenly and because of their varied shapes and colors, they have always attracted the interest of both scientists and laymen.

The life cycle of the biological entity of our strain is short both in time and space; this makes it an ideal material for science teaching and experimentation.

In order to be able to utilise them as food or as didactic material or otherwise, man has attempted for a very long time to grow mushroom, to domesticate them. Unfortunately, it proved to be harder than one might have thought. Cultivating wild mushrooms has not been a complete success. Fungi have precise and complex physiological, physical and sexual requirements which are not easily satisfied. Only a few species have been successfully grown under experimental conditions and fewer still have been retained for production on an industrial scale. Psalliota, the so-called "bed mushroom", is by far the most widespread, followed by Shii-Take or *Lentinus edodes which is widely cultivated in Asia*.

It has never been possible to have home exploitation of a mushroom garden having a fast and complete life cycle producing edible mushrooms with well developed fruit-bodies "Basidiomycetes, Agaricales" within 8 to 12 days. Now comes a new cultural method using natural yet very advanced techniques in view of its simplicity which puts it within reach of even those without any knowledge of biology.

The production of Quebec Pleurotus "Super Mushroom"—the gourmet mushroom which grows in a matter of a few days, answers to a need which exists where mushroom cultivation is concerned whether it be for economic, didactic or recreational ends. The proposed kit is complete, the only additional requirements being water and care. Eight to twelve days after it is set up, one is rewarded with the appearance of beautiful white Pleurotus mushrooms. Production is repeated until depletion of nutrients in the substrate which occurs after 4-5 crops.

The tasty white Pleurotus mushroom, which has a delicate aroma, goes as well with meat as it does with fish and shell-fish. They make good salads as well. During appreciation tests of their organoleptic characters, these mushrooms, prepared in a number of ways, have unanimously received a positive rating.

In a Natural Science or Biology laboratory, the kit may serve as a readily available and cheap tool for training in observation and experimentation.

For those with refined tastes and who are drawn to exceptional exotism, a bouquet of white Pleurotus mushroom is a worthwhile addition to an interior miniature garden.

It is noteworthy that this fungus, by its very nature, will never cause any damage to other organisms or materials around it.

| Substrate composition | | |
|---|---|---|
| | Quantity (units) | |
| Ingredients | Maximum | Minimum |
| (a) Straw | 300 | 200 |
| (b) Wood chips from broad-leaved trees | 200 | 50 |
| (c) Crushed shelled ears of corn | 250 | 50 |
| (d) Vermiculite | 100 | 40 |
| (e) Japanese millet | 50 | 10 |
| (f) Mixed cereal grains | 50 | 15 |
| (g) Lime | 10 | 5 |
| (h) Micro-cel | 30 | 20 |
| (i) Inoculum | 50 | 10 |

DESCRIPTION OF SUBSTRATE COMPONENTS (a) Straw. Dried grass straw (5-10% humidity) finely chopped to lengths between 1.5 and 4.5 cm is preferred. Must be weed-free and kept without any transformation from the time of harvest.

(b) Wood chips from broad-leaved trees, preferably *Betula papyrifera* and *Populus tremuloides*. The wood chips are obtained from squared blocks cut up by successive planing to obtain pieces between $1.5 \times 2.5$ to $2.0 \times 3.0$ cm.

(c) Crushed shelled ears of corn (containing less than 2% of grain particles), sieved to retain only particles able to pass through 5.0 mm diameter pores.

(d) Vermiculite which is crushed mica, subjected to high temperature (871° C.) to dilate the plates. It is a sterile pH-stabilizing medium. It has very good water retention ability. Particle size is between 3.0 and 4.0 mm diameter. Furthermore, vermiculite contains Mg and K which favour culture growth.

(e) Japanese millet, available from seedsmen.

(f) Mixed cereal grains with equal parts of oats, barley and wheat.

(g) Lime "agricultural" (CaO), calcium oxide.

(h) Micro-cel, so-called Calflo ™, is an hydrated synthetic calcium silicate, produced by hydrothermal reaction of diatomaceaus silica and lime. Because of its unique physical properties, when added to the substrate it encourages growth of "Super Mushroom".

(i) Inoculum is mushroom spawn 107-Aa from G. MYCOLA INC., bearing the vernacular name of White Pleurotus prepared according to strict rules.

PROCEDURES FOR THE PREPARATION OF THE CULTURE SUBSTRATE

Ingredients a, b, c, d, e, and f are individually placed in soaking tanks for 24 hours, then air dried to bring down water content to 75 to 80%. Afterwards everything is sterilised for 30 minutes, then cooled to 25° C. before adding ingredients g and h.

Individual polypropylene bags are filled with the homogeneous mixture and sterilised for 2.5 hr at 15 p.s.i and 250° F., then cooled to 20° C. and seeded with the inoculum.

To ensure that the fungus will grow, the bags are kept for 15 to 20 days in the dark at 20° C.±2°. At the end of this period, the aeration plug is removed and the bags are hermetically and aseptically sealed.

The produce can be stocked indefinitely at 0° to 5° C. or can be caused to fruit by the proper culture techniques.

CULTURE TECHNIQUES

Optimum humidity for growth is 75 to 85%.
Optimum pH is 6.2 to 6.8.

A very small amount of light is necessary to induce fruiting.

A short photoperiod is essential for normal fruit-body development. A minimum of 2.5 hours of light every 24 hours ensures normal development of mushrooms. A minimum intensity of 125 lux ensures a normal development.

Thermal requirements:
incubation period: 22° C.±2°.
fruiting period: 14° C. to 21° C. with an optimum at 19° C.

Procedure

1. Choose a shaded area where you will be able to keep your "Québec Pleurotus Super Mushroom," for a number of days.
2. Lift the plasticized lid.
3. Cut round the bag and remove the top as illustrated.
4. Spray the surface of the contents with water.
5. Using two sticks (provided), lift one side of the plasticized lid and fold back the rim of the vessel at the other end to keep it in place;
6. Keep your installation of the Super Mushroom culture in this position until the appearance of the Québec Pleurotus (10–12 days), humidify as required;
   Bear in mind that quite a bit of humidity is needed to successfully grow mushrooms
7. When the mushrooms start to increase in size and in order not to impair their growth, lift the other end of the lid and keep it up using the two other sticks provided;
8. Harvest your Québec Pleurotus Super Mushrooms by carefully cutting them at the substrate level using a sharp blade;
9. The Québec Pleurotus Super Mushroom grows periodically. As soon as the first harvest is completed (4–5 days) and there is no appearance of new mushrooms, remove the small undeveloped mushrooms using a sharp blade;
10. Humidify then close back the plasticized lid. Keep in this state for 3–5 days;
11. If a new crop of mushrooms is required, go back to step 5; otherwise stock everything in a refrigerator and start again at step 5 as and when required;
12. These operations can be repeated.

GENERAL DESCRIPTION OF THE MUSHROOMS PRODUCED

The mushroom 107-Aa from G. MYCOLA Inc. is the species or biological entity belonging to the Class Basidiomycetes, Agaricales, and the Family Pleurotaceae. The hymenium is borne on gills (lamellae) under a cap (pileus) which is sometimes shell-shaped, but more often shaped as a split funnel and borne on a foot (stipe) which is off centre.

This mushroom is a saprophyte capable of utilizing both liginin and cellulose.

The mushrooms produced are ivory white, petal-shaped with an agreeable smell and tolerate well warehousing in the fresh state, deep freezing and freeze drying.

Color, shape and general appearance may vary with age, water content, $CO_2$ content of the ambient atmosphere and the amount and quality of light.

Cap: It is particularly sensitive to the factors mentioned above. The yellowish creamy-white fruit bodies darken at the margin. The cap looks like shells placed upside down and stacked on top of one another and with an average diameter of 2–8 cm. The margin is thin, the flesh is rather thick and white.

Gills or lamellae: They are decurrent and run down the foot. Mature or old mushrooms have gills which are linked at the bottom by anastomoses.

Foot: White, off centre or laterally inserted, often very short. It is cylindrical and solid and hard and hairy at the base when the mushroom is old. It measures 0.5 to 1.5 cm in diameter and its length does not exceed 4.5 cm.

Spores: White but become lilac-colored. Both taste and smell are exquisite. The flavour of very young mushrooms is more refined than that of those which have remained on the substrate for a long time.

ADDITIONNAL INFORMATION

As far as we know, there is no other system which allows the production of mushroom of the white Pleurotus type, which is an excellent edible mushroom, within 8 to 12 days.

Existing kits which resemble ours the most are for other mushroom types, require a technique which is rather complicated for laymen and require a period 3 to 4 times longer to produce the mushrooms.

"Home-Gro © Mushroom Garden (*Trademark), patented. 1966 Mushroom Supply Company, Kennett Square, PA, 19 348 (World's Mushroom Center), Specialists in Mushroom Farming since 1924"

There are other kits available, such as:

"Shiitake tree TM, the ultimate art of mushroom cultivation", from The Kinoko Co.;

"Shiitake mushroom log", from Thompson & Morgan;

"The Kinoko Company, P.O. Box 6 425, Oakland, Calif. 94621, since 1976 has marketed "Mushroom-Mate TM, mushroom growing kit", with different techniques and different mushroom species.

I claim:

1. A substrate for the cultivation of mushrooms including Quebec Pleurotus Super Mushroom, said substrate consisting essentially of a homogeneous mixture of:
   (a) 300 to 200 units of straw;
   (b) 200 to 50 units of wood chips from broad-leaved trees;
   (c) from 250 to 50 units of crushed shelled ears of corn;
   (d) from 100 to 40 units of vermiculite;
   (e) from 50 to 10 units of Japanese millet;
   (f) from 50 to 15 units of mixed cereal grains;
   (g) from 10 to 5 units of lime;
   (h) from 30 to 20 units of micro-cel; and
   (i) from 50 to 10 units of Quebec Pleurotus inoculum.
2. The substrate of claim 1, wherein the said straw is dried grass straw of 5 to 10% humidity, finely chopped to lengths of between 1.5 and 4.5 cm.

3. The substrate of claim 1, wherein the said wood chips from broad-leaved trees are obtained from *Betula papyrifera* or *Populus tremuloides*.

4. The substrate of claim 1, wherein the said crushed shelled ears of corn contain less than 2% of grain particles and are seived to retain only particles able to pass through 5.0 mm diameter pores.

5. The substrate of claim 1, wherein the said vermiculite has been subjected to a temperature sufficient to dilate the plates.

6. The substrate of claim 1, wherein the said mixed cereal grains contain equal parts of oats, barley and wheat.

7. A process for the cultivation of Quebec Pleurotus Super Mushroom, which comprises:
- obtaining a substrate of claim 1, said substrate being seeded with said Quebec Pleurotus inoculum,
- maintaining the said substrate at a humidity of 75 to 85% and a pH of 6.2 to 6.8,
- permitting said substrate to undergo a photoperiod of about 2.5 hours at a light intensity of 125 lux, and
- incubating the mixture at 22° C. followed by fruiting at about 14° C. to 21° C. for about 8 to 12 days.

* * * * *